(12) United States Patent
Mizes et al.

(10) Patent No.: US 7,154,110 B2
(45) Date of Patent: Dec. 26, 2006

(54) SYSTEMS AND METHODS FOR IMPROVING CALIBRATION OF A LINEAR ARRAY SENSOR

(75) Inventors: Howard A. Mizes, Pittsford, NY (US); Peter Paul, Webster, NY (US); Michael D. Borton, Ontario, NY (US); Stanley J. Wallace, Victor, NY (US)

(73) Assignee: Xerox Corporation, Stamford, CT (US)

( * ) Notice: Subject to any disclaimer, the term of this patent is extended or adjusted under 35 U.S.C. 154(b) by 208 days.

(21) Appl. No.: 10/953,321

(22) Filed: Sep. 30, 2004

(65) Prior Publication Data
US 2006/0071185 A1    Apr. 6, 2006

(51) Int. Cl.
 G01N 21/86    (2006.01)
(52) U.S. Cl. .................. 250/559.1; 250/208.1
(58) Field of Classification Search ............. 250/559.1, 250/208.1, 221, 559.26, 559.38
See application file for complete search history.

(56) References Cited

U.S. PATENT DOCUMENTS

| | | | |
|---|---|---|---|
| 4,514,858 A | 4/1985 | Novak | |
| 4,516,253 A | 5/1985 | Novak | |
| 4,641,256 A * | 2/1987 | Marchegiano et al. | ........ 702/57 |
| 5,087,933 A | 2/1992 | Stearns | |
| 5,713,062 A | 1/1998 | Goodman et al. | |
| 5,897,239 A | 4/1999 | Caruthers, Jr. et al. | |

* cited by examiner

Primary Examiner—Que T. Le
(74) Attorney, Agent, or Firm—Oliff & Berridge, PLC (57) ABSTRACT

Systems and methods provide calibration for a linear array sensor. A test pattern having a plurality of lines is used. Comparison between expected and measured spacing between a pair of neighboring lines is used to determine sensor position displacement.

29 Claims, 8 Drawing Sheets

SYSTEMS AND METHODS FOR IMPROVING CALIBRATION OF A LINEAR ARRAY SENSOR

BACKGROUND OF THE INVENTION

1. Field of Invention

This invention relates to systems and methods for improving calibration of a linear array sensor.

2. Description of Related Art

Linear array sensors have been used in binary applications, such as, for example, in a bar code reader. In these applications, each sensor element is used to determine whether light is on or off.

A linear array sensor consists of a series of light sensitive pixels. The pixels are generally characterized by a dark current and a gain. The dark current gives rise to a charge on the sensor when there is no light input. The gain gives the additional charge built up on each pixel per unit of light input.

The dark current and gain of each pixel can be different. When linear array sensors are used for input scanners, the sensitivity of the sensors is calibrated by measuring the response of each pixel under no illumination and the response of each sensor scanning a uniform strip. These two measurements are used to calculate a gain and an offset for the each pixel. This calibration is used to derive a linear equation to relate the charge buildup on each pixel, to the reflection from a surface.

SUMMARY OF THE INVENTION

The voltage increase of linear array sensors in response to light input is linear for small light exposures, but saturates for high light exposures. Therefore, for some applications, it may be necessary to use a non-linear equation to relate the response of the sensor to the light exposure.

Some linear array sensors are composed of separate sensor chips butted together. The spacing between neighboring pixels across the sensor chips may not be equal to the spacing between the pixels within a sensor chip. In addition, the sensor chip may be slightly rotated with respect to the axis of the sensor, changing the pixel spacing projected onto the axis of the sensor. Some applications of a linear array sensor require an accurate knowledge of the spacing between each pixel. One particular application is the use of the linear array as a registration sensor in a direct marking printer.

Various exemplary embodiments of the systems and methods according to this invention provide a method for a spatial calibration of a linear array sensor, comprising: providing a target that may have one or more strips; each strip comprising a line target having a plurality of lines of known spacing; obtaining a series of linear array sensor profiles for each strip at different relative positions of the linear array sensor to the strips in a direction perpendicular to the direction of the lines; extracting the centers of the lines from the linear array sensor profile; and determining a displacement associated with each pixel of the linear array sensor based on the known spacing and the measured spacing of the lines.

Various exemplary embodiments of the systems and methods according to this invention provide a method for gray level calibration of a linear array sensor in applications where a substrate of nonuniform reflectivity is monitored. The substrate can be a belt or a drum.

In various exemplary embodiments, the substrate is a drum. The drum has an axis and rotates about the axis. The method comprises: determining a first set of calibration parameters when the drum is at a first rotation angle about the axis, the first set of calibration parameters associated with calibrating the linear array sensor in a direction along the axis when the drum is at the first rotation angle about the axis; determining a second set of calibration parameters when the drum is at a second rotation angle about the axis, the second set of calibration parameters associated with calibrating the linear array sensor in the direction along the axis when the drum is at the second rotation angle about the axis; and storing the first and second sets of calibration parameters.

In various other exemplary embodiments, the substrate is a belt. The belt moves in a process direction along a path. The method comprises: determining a first set of calibration parameters when a reference point of the belt is at a first location along the path, the first set of calibration parameters associated with calibrating the linear array sensor in a direction perpendicular to the path when the belt is at the first location; determining a second set of calibration parameters when the reference point is at a second location in the path, the second set of calibration parameters associated with calibrating the linear array sensor in the direction perpendicular to the path when the reference point is at the second location; and storing the first and second sets of calibration parameters.

In various exemplary embodiments, more than two sets of parameters are obtained and stored. In such exemplary embodiments, a number of n=C/S sets of parameters are stored, where C is the circumference of the drum or the length of the belt, and S is a distance over which the calibration may change.

In various exemplary embodiments, more than two levels of illumination are provided on the substrate. The corresponding responses at the linear sensor are used for nonlinear gray level calibration.

This and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Various exemplary embodiments of systems and methods according to this invention provide improved calibration for linear array sensors. In various exemplary embodiments, the calibration may be performed before a linear array sensor is mounted in a printer. In this exemplary embodiment, the test pattern is printed on paper or some other substrate. In this exemplary embodiment, the linear array sensor may be a full-width array sensor. In various other exemplary embodiments, the calibration may be performed in the printer on the substrate that the linear array sensor is imaging.

Figure 1:
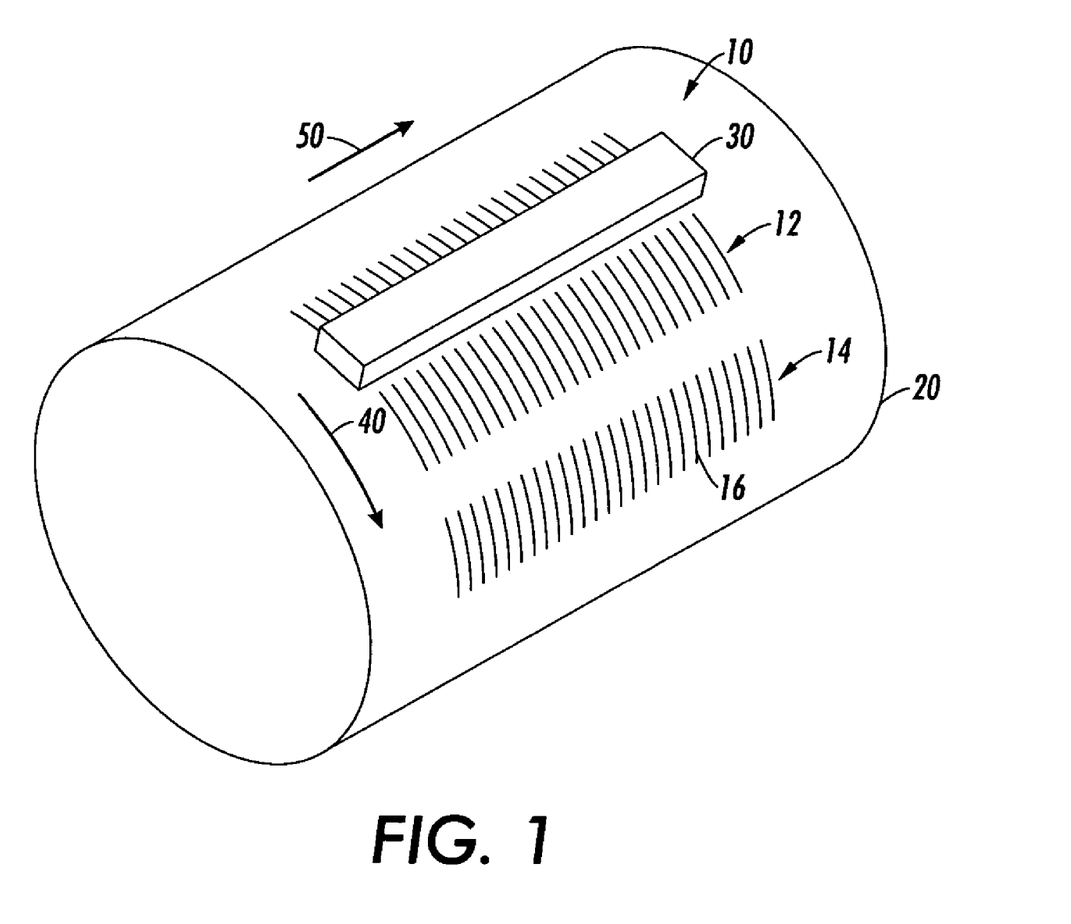
FIG. 1 illustrates an exemplary embodiment of a test pattern, a receiving member and a sensor according to this invention.

FIG. 1 illustrates an exemplary embodiment of a test pattern 10, a drum 20 and a sensor 30 according to this invention. In the system shown in FIG. 1, the test pattern 10 consists of a set of one or more strips 12, 14. Each strip 12, 14 consists of a set of lines 16 oriented in the process direction 40 and spaced in the cross process direction 50. The sensor 30 monitors the test pattern 10 as the drum 20 rotates under the sensor 30. In various exemplary embodiments, the spacing between the lines 16 is known.

In various exemplary embodiments, the spacing of the lines in different strips 12 and 14 are the same. In various other exemplary embodiments, the spacing of the lines in different strips 12 and 14 are different.

In various exemplary embodiments, the distances between different neighboring pairs of the lines 16 are regular or the same. In various other exemplary embodiments, the distances between different neighboring pairs of the lines 16 are different or random.

In various exemplary embodiments, the calibration is made by monitoring the test pattern 10 when the linear array sensor 30 is in a fixed position. In various other exemplary embodiments, the calibration is made by obtaining a plurality of measurements with the linear array sensor 30 moved in the cross process direction 40, which is perpendicular to the direction of the plurality of lines.

Figure 2:
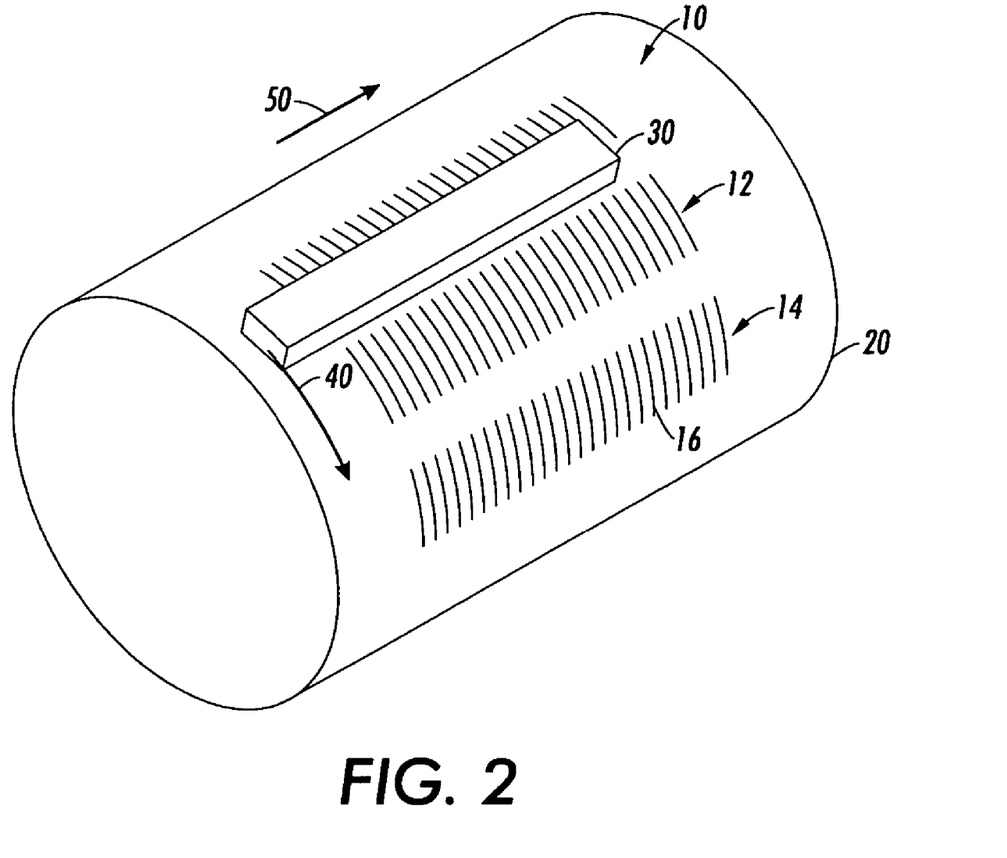
FIG. 2 is similar to FIG. 1, except that the sensor is translated in the cross process direction.

FIG. 2 illustrates the same exemplary embodiment shown in FIG. 1, but with the sensor 30 translated in the cross process direction 50.

Figure 3:
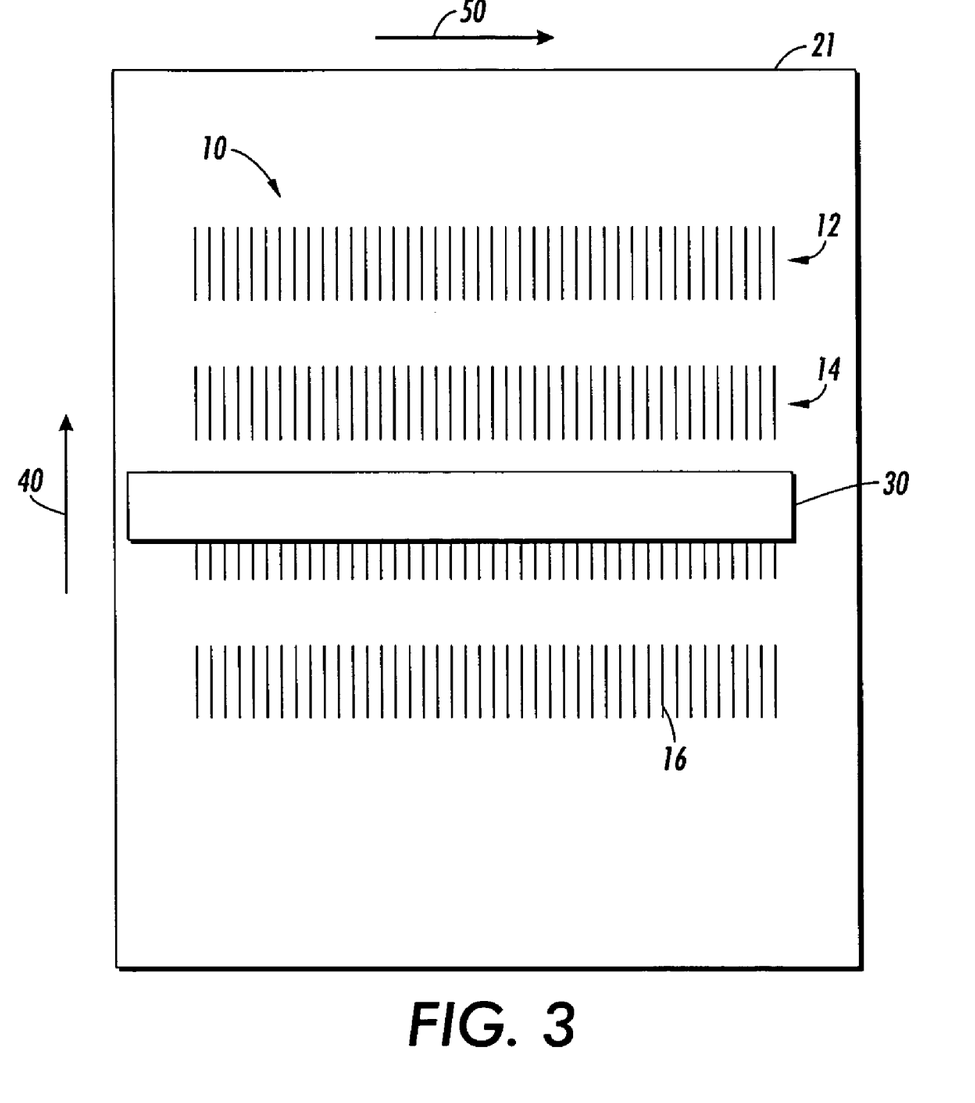
FIG. 3 illustrates an exemplary embodiment of a test pattern, a flat substrate and a sensor according to this invention.

The sensor 30 can be calibrated before being used in a printer. FIG. 3 illustrates an exemplary embodiment of a test pattern 10, a substrate, such as paper 21, with the test pattern 10, and a sensor 30. In the system shown in FIG. 3, the test pattern 10 consists of a set of one or more strips 12, 14. Each strip 12, 14 consists of a set of lines 16 oriented in the process direction 40 and spaced in the cross process direction 50. The sensor 30 can monitor the test pattern 10 as the substrate 21 moves under the sensor 30. Alternatively, the sensor 30 can monitor the test pattern 10 as the sensor 30 is moved over the test pattern 10.

Figure 4:
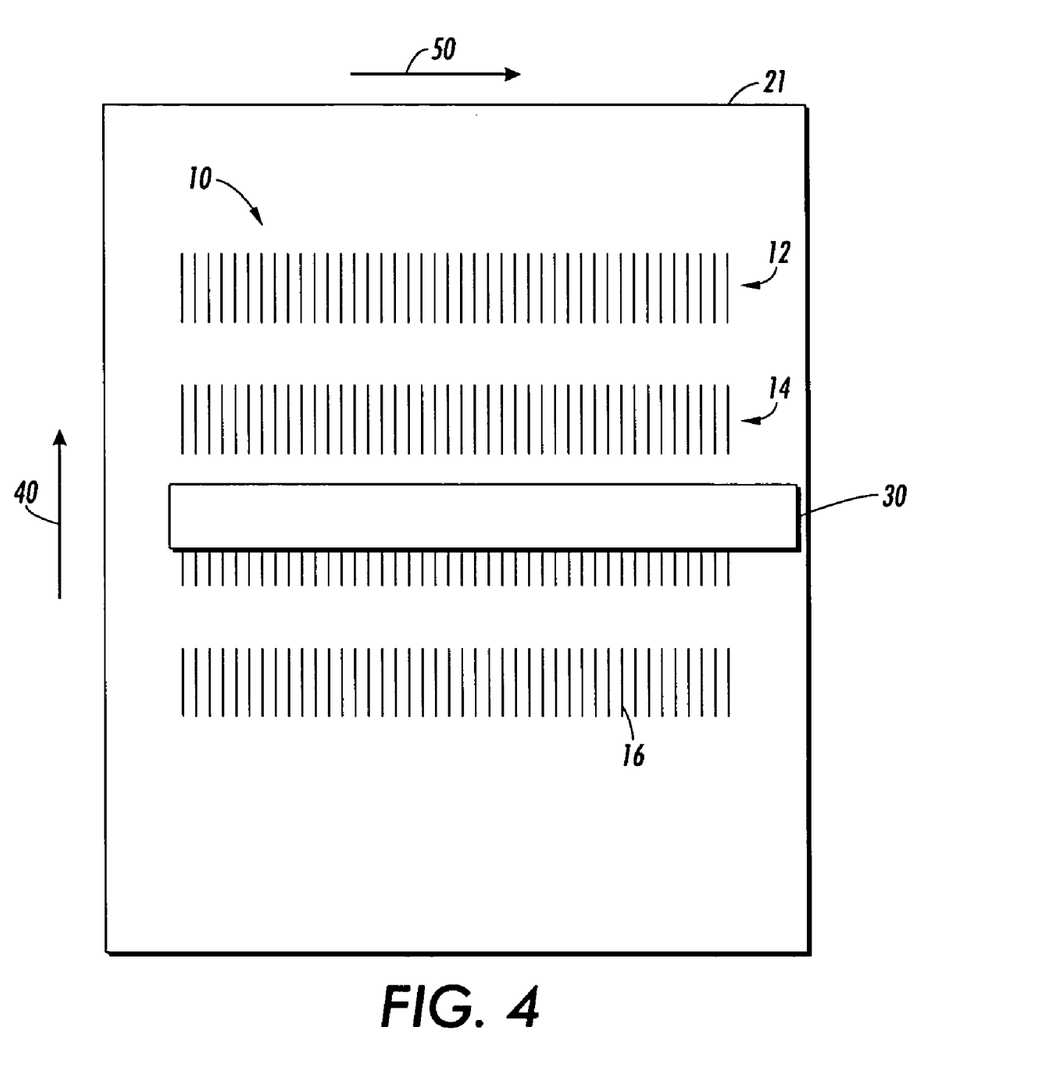
FIG. 4 is similar to FIG. 3, except that the sensor is translated in the cross process direction.

FIG. 4 illustrates the same exemplary embodiment shown in FIG. 3, but with the sensor 30 translated in the cross process direction 50 which is perpendicular to the orientation of the test pattern lines 16.

In various exemplary embodiments, measurements are obtained for the linear array pixel response profile for a dark level and for a single exposure level. In such exemplary embodiments, a gain and an offset for each pixel of the linear array may be established.

In various other exemplary embodiments, measurements are obtained for the linear array pixel response profile for a dark level and for more than one light exposure levels. In such exemplary embodiments, a non-linear relationship may be established between each pixel and the light exposure.

In various exemplary embodiments, to establish the non-linear relationship for each pixel in a linear sensor before it is mounted in a printer (calibration-on-paper technique), the linear array pixel response profile may be mapped by varying the illumination level and monitoring the response to a uniform patch of high reflectivity. An alternative for the calibration-on-paper technique is to monitor a plurality of uniform surfaces, each having a different reflectivity.

In various exemplary embodiments, for establishing the non-linear relationship for each pixel of a linear sensor after the sensor is mounted on the drum (calibration-on-drum technique), the linear array pixel response profile may be mapped by varying the illumination while the sensor monitors a fixed location on the drum surface.

In various exemplary embodiments, to establish the non-linear relationship for each pixel of a linear sensor, the sensor response to more than one levels of illumination intensity is measured. Typically, the response is linear for low levels of illumination. Also typically, at higher illumination levels, the sensitivity of sensor response decreases until it starts to saturate. For calibration purposes, various techniques may be used to relate the sensor response to the local reflectivity of the surface. In one exemplary embodiment, the intermediate responses may be interpolated between the measured responses for each sensor pixel. In other various exemplary embodiments, a function may be fit to each pixel response as a function of illumination intensity. In various exemplary embodiments, a quadratic polynomial function is used to fit the sensor responses. In various other exemplary embodiments, an exponential function is used.

In various exemplary embodiments, a table of coefficients of the fitting function is obtained. The coefficients are used to expeditiously convert a raw sensor measurement into a calibrated sensor measurement when needed.

Various exemplary embodiments of the systems and methods according to this invention provide for marking device receiving member signature calibration. In one exemplary embodiment, the variations of the drum in reflection may have an x-axis signature component, as a function of the axis of the drum (the x-direction), and a rotational signature component, as a function of the rotation angle $\theta$ of the drum. In another exemplary embodiment, the variations of the belt in reflection may have an x-axis signature component, as a function of the cross process position on the belt (the x-direction), and a process direction signature component, as a function of the cross process position on the belt.

In the exemplary embodiment in which the receiving member is a drum, the variation of the reflection along the axis of the drum for a fixed $\theta$ may be confounded with the linear sensor pixel profile. In various exemplary embodiments, for the calibration-on-drum technique, the calibration of the sensor response may automatically calibrate for the x-axis drum signature.

When the drum reflection variation along the x-axis is separable from the drum reflection variation as a function of $\theta$, the drum reflection may be expressed as a product of the x-axis component and the rotational component:

$$r(x,\theta)=r_x(x)r_\theta(\theta), \qquad (1)$$

where r is the reflectivity of the drum surface.

In various exemplary embodiments, the reflection variation as a function of $\theta$ (the rotational signature) may be measured by measuring a linear sensor profile and determining the average response of all the pixels. The average sensor response is monitored as a function of rotation angle for a fixed illumination. The average sensor response is used as a scale factor for the calibration. During operation of the sensor, the rotation angle is monitored using a drum encoder, with an appropriate scale factor. The sensor profile is multiplied by the scale factor preceding further processing of the linear sensor image.

When the drum reflection variations in the x-axis direction are not separable from the rotational signature, the rotational signature may depend on a geometric parameter, such as the runout of the drum, or a variation in the property of the drum surface. In various exemplary embodiments, a separate calibration is performed at each rotational angle of the drum. A relationship may be established between drum rotational angles and the period of variations. During operation of the sensor, the rotation angle is monitored using a drum encoder, with an appropriate calibration table.

In various exemplary embodiments using a drum, n sets of calibration parameters are obtained and stored, where n is an integer greater than two and less than n=C/S, C being a circumference of the drum, and S being a distance on a surface of the drum corresponding to an angular difference between two rotation angles over which the calibration can change significantly.

In the exemplary embodiment in which the receiving member is a belt, the variation of the reflection in the cross process direction for a fixed process direction position may be confounded with the linear sensor pixel profile. In various exemplary embodiments, the calibration of the sensor response may automatically calibrate for the cross process direction belt signature. When the belt reflection variation in the cross process direction is separable from the belt reflection variation as a function of the process direction position, the belt response may be calibrated in a way similar to that expressed in Equation (1), except that the rotational component $r_\theta(\theta)$ of the drum needs to be replaced by a corresponding process direction component of the belt.

In various exemplary embodiments using a belt, n sets of calibration parameters are obtained and stored, where n is an integer greater than two and less than n=C/S, C being the length of the belt, and S being a distance on the belt between two process direction positions over which the calibration can change significantly.

Various exemplary embodiments of the systems and methods according to this invention provide sensor pixel position calibration. In various exemplary embodiments, a sensor pixel position calibration may be made by measuring a random line target on a receiving member. The receiving member may include an image recording medium, a photoreceptor drum, an intermediate belt, or the like.

Figure 5:
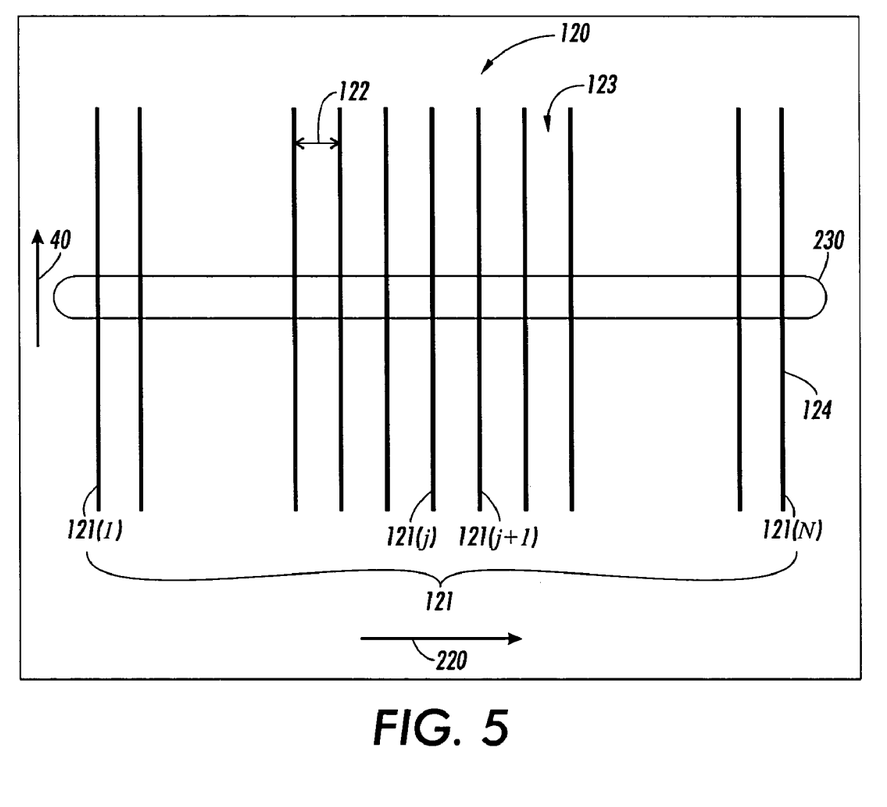
FIG. 5 illustrates an exemplary embodiment of a test pattern according to this invention.

FIG. 5 illustrates an exemplary embodiment of the test pattern 120 shown in FIG. 1. As shown in FIG. 5, the test pattern 120 may include a plurality of lines 121 on a receiving member. In various exemplary embodiments, the lines are substantially parallel to each other. Each line extends in the process direction 210 of the printer.

In various exemplary embodiments, for the calibration-on-paper technique, the line spacing 122 in the test pattern is known. For example, the line spacing has been accurately measured using another technique. Or, the device that prints the lines is know a priori to accurately position the lines. In various exemplary embodiments, for the calibration-on-drum technique, the test pattern is printed on the drum itself.

In various exemplary embodiments, a calibration is needed for a direct marking print engine. The ink ejected from a direct marking print head can have some misdirectionality in the cross process position that is different for each nozzle, but is constant over the time it takes to write the test pattern. In various exemplary embodiments, this misdirection may be mitigated by printing test patterns containing sets of lines printed by a same nozzle. In this configuration, the separation of dashes printed only with the same nozzle is compared and analyzed in calibration. In various exemplary embodiments, the separation is controlled by printing the test pattern with multiple passes, and then measuring the displacement between passes with an x-axis encoder. The separation between test pattern lines can be derived from the x-axis encoder response.

The spatial calibration is performed by analyzing one or more linear sensor response profiles taken when the drum is positioned under the sensor. The presence of printed lines changes sensor response. In particular, the presence of ink on the drum can either decrease or increase the response of sensors, depending on the relative colors of the ink and the drum and the texture of the ink and the drum. For the ease of discussion, it is assumed that the presence of ink decreases sensor response. However, it should be appreciated that the discussion below also applies when the presence of ink increases sensor response.

In various exemplary embodiments, a cross section 230 of sensor response is used for calibration. As shown in FIG. 5, the cross section 230 of the sensor response is a collection of profiles through the lines or dashes 121 in the test pattern 120. A profile includes sensor response along the cross process direction 220 at a particular process direction location. In various exemplary embodiments, the cross section 230 is a collection of profiles through all the dashes 121 in the test pattern 120. In various other exemplary embodiments, the cross section 230 is a collection of profiles through the dashes 121 near an area where calibration is required.

In a response profile of a cross section 230 of sensor response, sensor response maxima occur at locations corresponding to positions where dashes 121 do not exist, such as the gaps 123 between dashes 121. On the other hand, sensor response minima occur in the response profile at positions corresponding to locations where dashes 121 are printed. The positions of the minima are used to obtain the locations of the corresponding dashes 121.

In various exemplary embodiments, the centers 124 of the lines or dashes may be determined based on the cross section of sensor response, using the minima in the response profile. The determination may be achieved by any existing or later developed techniques. In various exemplary embodiments, the center 124 of a dash line is determined based on an interpretation of the response data near the dash line, a mid-point of the line edges of a detected dash line, a non-linear least squares fit, or a multi-dimension vector under the Radar theory.

In various exemplary embodiments the test pattern 120 includes S strips (see FIGS. 1–4). Each strip can be measured one or more times, with the sensor in a different cross process position. Each strip can contain N lines. N can be different for each strip, but for simplicity, we assume it is equal for all strips.

In various exemplary embodiments, the spacing 122 between neighboring lines 121 which is known is used. Let $p_{i,j+1} - p_{i,j}$ be the difference in the positions of the line indexed by j+1 and the line indexed by j for measurement number i. Note that more than one measurement can be taken per strip for the linear sensor in a different cross process position. The difference between the measured and expected spacing may be expressed as:

$$\Delta x_{P_{i,j+1}} - \Delta x_{P_{i,j}} = (p_{i,j+1} - p_{i,j}) - (x_{i,j+1} - x_{i,j}), \quad (2)$$

where the first term on the right hand side of the equation is the known spacing 122.

In one exemplary embodiment, sufficient measurements are made so that Δx is sampled as finely as the spacing between pixel elements on the linear array sensor. In another exemplary embodiment, less measurements are made and an interpolation technique is used to determine the offsets of the pixel elements that have not sampled the position of a line from the ones that have sampled the position of a line.

A sparse matrix equation may be established by obtaining Equation (2) for a plurality of neighboring line pairs in the test pattern 120. In addition, an overdetermined matrix equation may be obtained by establishing the Equation (2) for a plurality of measurements. In various exemplary embodiments, the Moore-Penrose technique or another equivalent technique may be used to solve this matrix equations.

In various exemplary embodiments, the solution obtained from the matrix equations is used as a displacement associated with each pixel element of the sensor. This displacement may be used to fine tune the calculation of the line centers 124. For example, when a line center 124 is found to be centered under a particular sensor, and this center 124 was determined as being displaced 10 μm, then the actual line center will be measured as 10 μm different from what is assumed based on equally spaced center positions.

Figure 6:
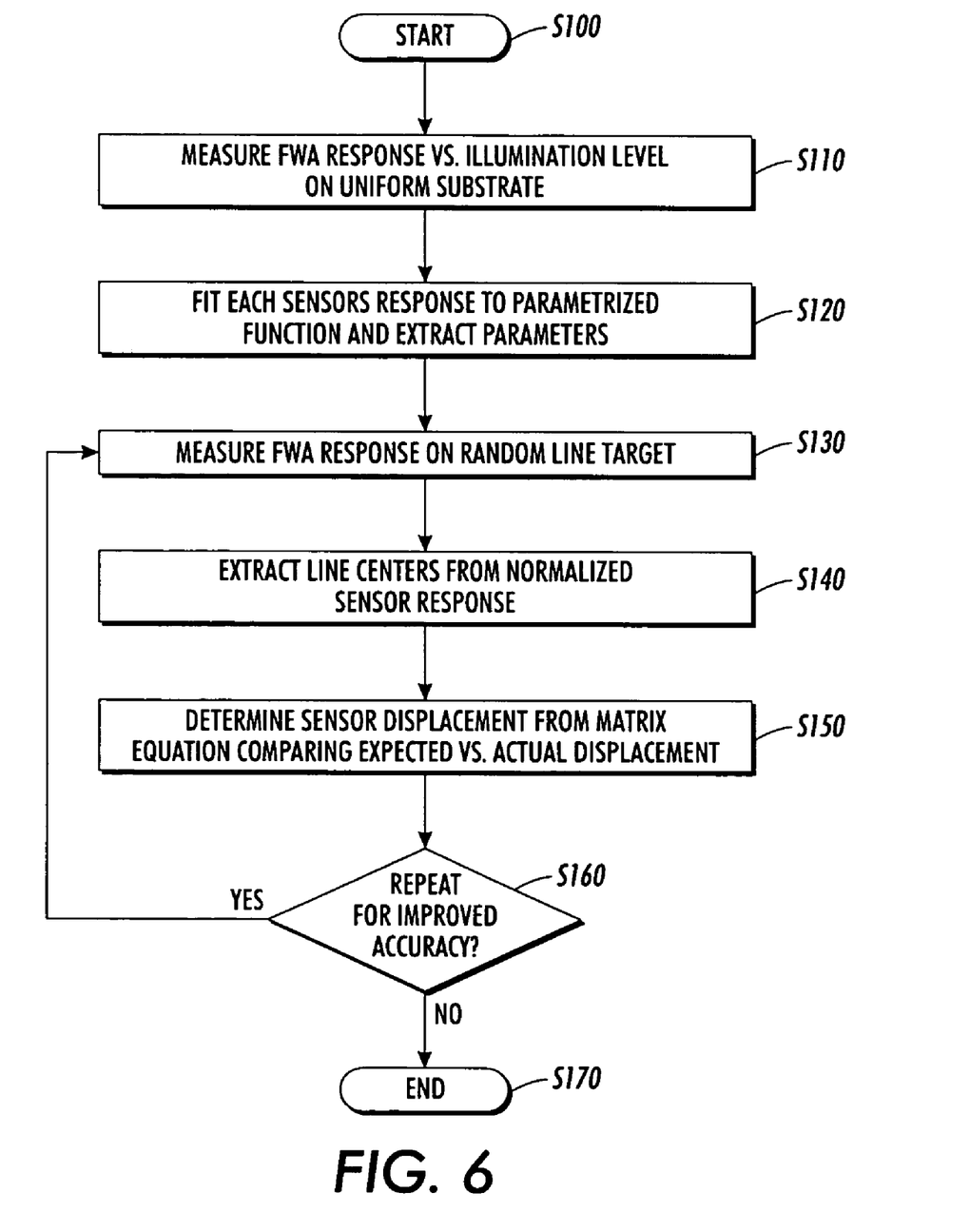
FIG. 6 is a flowchart outlining an exemplary embodiment of a calibration method according to this invention.

FIG. 6 is a flowchart outlining an exemplary embodiment of a calibration method using the calibration-on-paper technique. As shown in FIG. 6, the method starts at step S100 and continues to step S110, where linear array sensor responses to illumination levels are obtained.

Next, in step S120, a function is fit to the sensor responses obtained. In various exemplary embodiments, a linear function is fit to extract parameters such as the dark current and the gain. In various other exemplary embodiments, a non-linear function is fit to extract coefficients, including parameters that indicate saturation of the response.

Then, in step S130, measurements are obtained from sensor responses on a random line target. Next, in step S140, line centers are extracted from the measured sensor response. In various exemplary embodiments, the sensor response is normalized, and the line centers are extracted from the normalized sensor response.

Then, in step S150, sensor displacement is determined from matrix equations comparing expected and actual or measured displacement. Method then proceeds to step S160.

In step S160, a determination is made whether the displacement determination process needs to be repeated for improved accuracy. If it is determined in step S160 that improved accuracy is needed, the method returns to step S130. Otherwise, operation proceeds to step S170, where the method ends.

It should be understood that some steps in FIG. 6, such as steps S110, S120 and S160, may be omitted.

Figure 7:
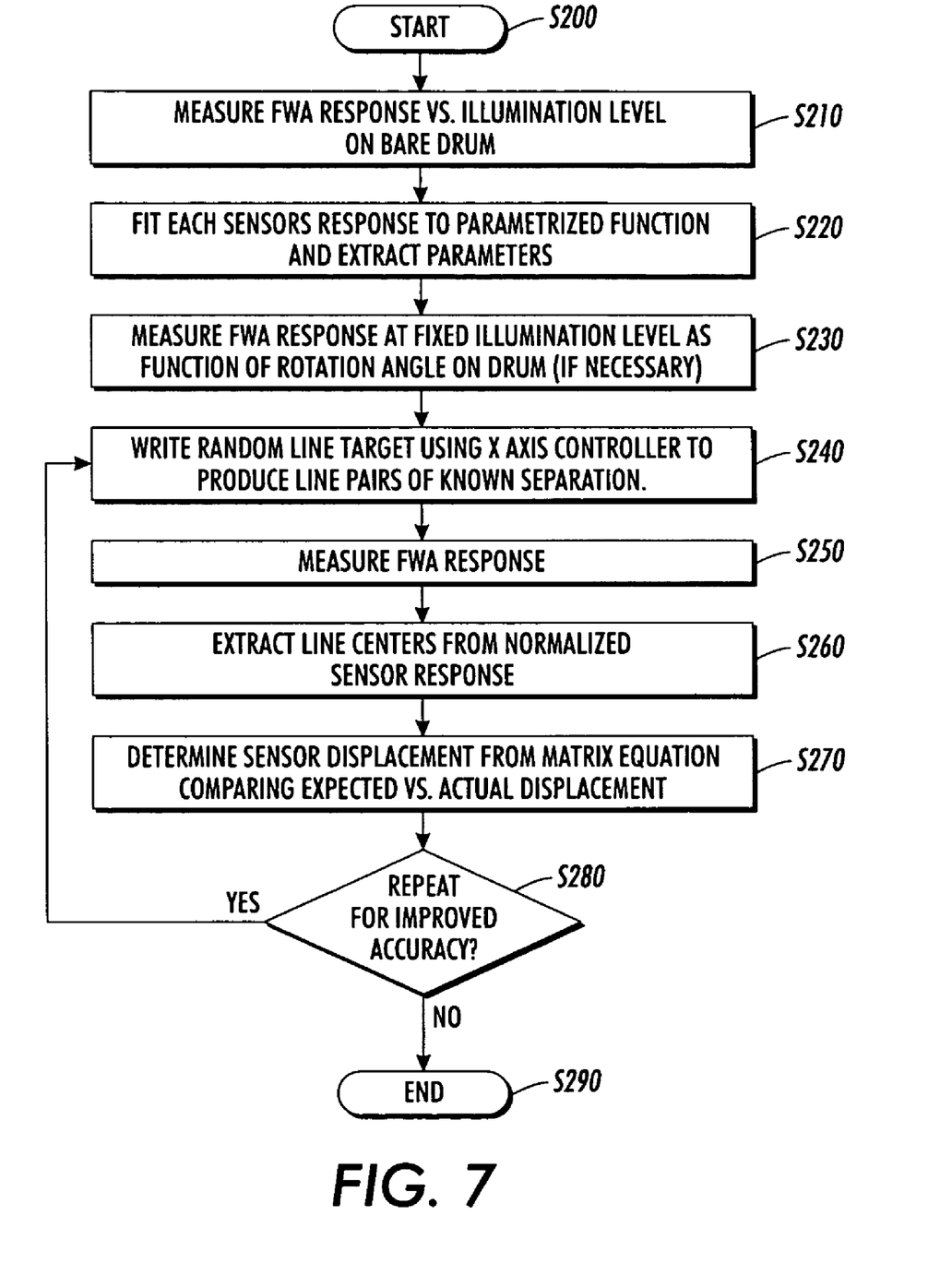
FIG. 7 is a flowchart outlining another exemplary embodiment of a calibration method according to this invention.

FIG. 7 is a flowchart outlining an exemplary embodiment for a linear array sensor calibration method for the calibration-on-drum technique. This method is similar to that shown in FIG. 6, except for the features related to the calibration-on-drum technique.

As shown in FIG. 7, the method starts at step S200 and continues to step S210, where sensor responses to the illumination level on the drum are obtained. Next, in step S220, a function is fit to the sensor responses to extract coefficients or/and parameters. The function may be linear or non-linear.

Then, in step S230, measurements are obtained from sensor responses at a fixed illumination level as a function of rotation angle of the drum. In various exemplary embodiments, this step is used for drum signature calibration, such as drum rotational signature calibration.

Next, in step S240, a random line target is generated using x-axis controller to produce line pairs of known separation. Next, in step S250, measurements are obtained from sensor response to the random line target.

Then, in step S260, line centers are extracted from the measured sensor response. In various exemplary embodiments, the measured sensor response is normalized and the line centers are extracted from the normalized sensor response.

Next, in step S270, sensor displacement is determined from matrix equations comparing expected and measured or actual displacement. Operation of the method proceeds to step S280.

In step S280, it is determined whether to repeat the displacement determination process for improved accuracy. If it is determined at S280 that improved accuracy is needed, operation returns to step S240. Otherwise, operation continues to step S290, where the method ends.

It should be understood that some steps in FIG. 7, such as steps S210, S220 and S280, may be omitted.

Figure 8:
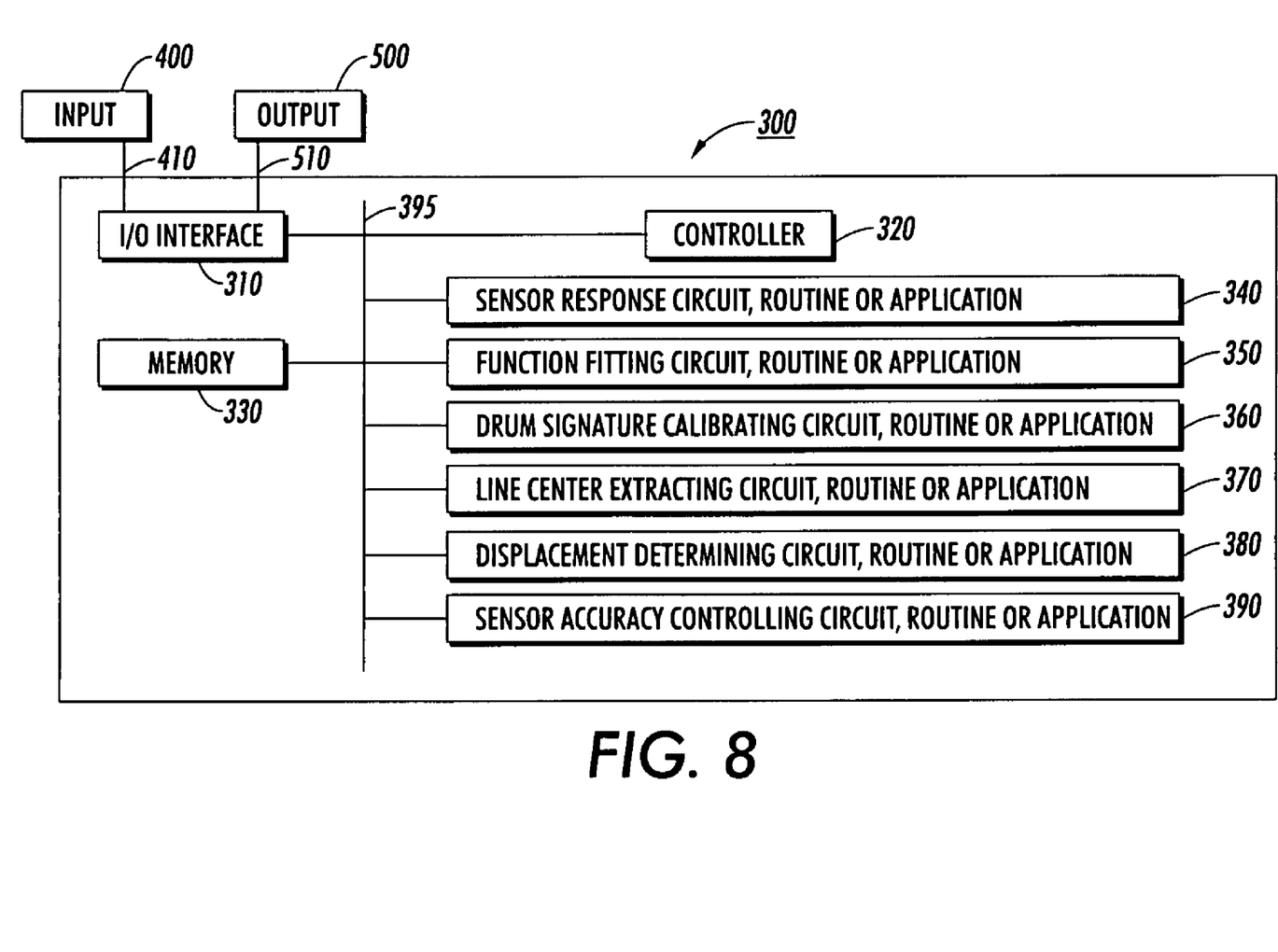
FIG. 8 is a functional block diagram of an exemplary embodiment of a calibration system according to this invention.

FIG. 8 is a functional block diagram of an exemplary embodiment of a linear array sensor calibration system according to this invention. As shown in FIG. 7, the system 300 may include an input/output interface 310, a controller 320, a memory 330, a sensor response obtaining circuit, routine or application 340, a function fitting circuit, routine or application 350, a drum signature calibrating circuit, routine or application 360, a line center extracting circuit, routine or application 370, a displacement determining circuit, routine or application 380, and a sensor accuracy controlling circuit, routine or application 390, each interconnected by one or more control and/or data buses and/or application programming interfaces 395.

In various exemplary embodiments, the system 300 is implemented on a programmable general purpose computer. However, the system 300 can also be implemented on a special purpose computer, a programmed microprocessor or microcontroller and peripheral integrated circuit elements, an ASIC or other integrated circuits, a digital signal processor (DSP), a hard wired electronic or logic circuit, such as discrete element circuit, a programmable logic device such as a PLD, PLA, FPGA or PAL, or the like. In general, any device capable of implementing a finite state machine that is in turn capable of implementing the flowchart shown in FIGS. 6 and 7 can be used to implement the system 300.

The input/output interface 310 interacts with the outside of the system 300. In various exemplary embodiments, the input/output interface 310 may receive input from the outside, such as an input 400, via one or more links 410. The input/output interface 310 may output data to an output 500 via one or more links 510.

The memory 330 may also store any data and/or program necessary for implementing the functions of the system 300. The memory 330 can be implemented using any appropriate combination of alterable, volatile, or non-volatile memory or non-alterable or fixed memory. The alterable memory, whether volatile or non-volatile, can be implemented using any one or more of static or dynamic RAM, a floppy disk and a disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or a DVD-ROM disk and disk drive or the like.

The sensor response obtaining circuit, routine or application 340 obtains linear array sensor response. The function fitting circuit, routine or application 350 performs function fitting to the sensor response. The drum signature calibrating circuit, routine or application 360 performs drum signature calibration. The line center extracting circuit, routine or application 370 extracts line centers from the sensor response. The displacement determining circuit, routine or application 380 determines sensor displacement. In various exemplary embodiments, the displacement determining circuit, routine or application 380 determines sensor displacement using Equation (4). The sensor accuracy controlling circuit, routine or application 390 determines whether repetition of process is necessary to improve accuracy.

The sensor response obtaining circuit, routine or application 340, the function fitting circuit, routine or application 350, the drum signature calibrating circuit, routine or application 360, the line center extracting circuit, routine or application 370, the displacement determining circuit, routine or application 380, and the sensor accuracy controlling circuit, routine or application 390, may receive data from, or send data to, the memory 330.

In operation, the sensor response obtaining circuit, routine or application 340, under control of the controller 320, receives linear array sensor response to illumination levels and sensor response to random line target. The function fitting circuit, routine or application 350, under control of the controller 320, fits a function to the sensor response to the illumination levels. In various exemplary embodiments, the function fitting performance establishes sensor response calibration.

The drum signature calibrating circuit, routine or application 360, under control of the controller 320, calibrates drum signature when the sensor has been mounted in a printer. In various exemplary embodiments, the drum signature calibrating circuit, routine or application 360, on the controller of the controller 320, calibrates drum signature in the x-axis direction and/or drum rotational signature based on the sensor response to illumination levels.

The line center extracting circuit, routine or application 370, under control of the controller 320, extracts line centers from the sensor response to the random line target. The displacement determining circuit, routine or application 380, under control of the controller 320, determines sensor displacement based on the extracted line centers and the known spacing between the line pairs in the random line target. The sensor accuracy controlling circuit, routine or application 390, under control of the controller 320, determines whether the extraction of line centers and/or determination of sensor displacement should be repeated for improved accuracy.

While particular embodiments have been described, alternatives, modifications, variations and improvements may be implemented within the spirit and scope of the invention.

What is claimed is:

1. A method for spatial calibration of a linear array sensor, the linear array sensor having a plurality of pixels, the method comprising:
   providing a target pattern having one or more strips, each strip including a line target having a plurality of lines of known spacing;
   obtaining a series of linear array sensor profiles for each strip at different relative positions of the linear array sensor to the strips in a direction perpendicular to a direction of the plurality of lines;
   extracting line centers from the linear array sensor profile; and
   determining a displacement associated with each pixel of the linear array sensor based on the known spacing and the extracted line centers.

2. The method of claim 1, determining the displacement including:
   obtaining a measured spacing of the plurality of lines based on the extracted line centers; and
   determining the displacement associated with each pixel of the linear array sensor based on the known spacing and the obtained line spacing.

3. The method of claim 1, the spatial calibration of the linear array sensor being performed before the linear array sensor is mounted in a printer.

4. The method of claim 1, the spatial calibration of the linear array sensor being performed after the linear array sensor is mounted in a printer.

5. The method of claim 1, the receiving member being a drum of a printer.

6. The method of claim 1, the receiving member being a belt of a printer.

7. The method of claim 1, the receiving member being a piece of paper.

8. The method of claim 1,
   the target pattern including first and second strips,
   the first strip including a first line target having a first plurality of lines of a first known spacing,
   the second strip including a second line target having a second plurality of lines of a second known spacing, and
   the first known spacing being different from the second known spacing.

9. The method of claim 1, obtaining the series of linear array sensor profiles including obtaining the series of linear array sensor profiles when the linear array sensor is in a fixed position.

10. The method of claim 1, obtaining the series of linear array sensor profiles including obtaining a plurality of measurements with the linear array sensor moved in the direction perpendicular to a direction of the plurality of lines.

11. The method of claim 1,
    a first pair of neighboring lines in the plurality of lines having a first distance between the first pair of neighboring lines,
    a second pair of neighboring lines in the plurality of lines having a second distance between the second pair of neighboring lines, and
    the first distance being different from the second distance.

12. The method of claim 1,
    a first pair of neighboring lines in the plurality of lines having a first distance between the first pair of neighboring lines,
    a second pair of neighboring lines in the plurality of lines having a second distance between the second pair of neighboring lines, and
    the first distance being equal to the second distance.

13. A machine-readable medium that provides instructions for spatial calibration of a linear array sensor, the linear array sensor having a plurality of pixels, the instructions, when executed by a processor, causing the processor to perform operations comprising:

providing a target pattern having one or more strips, each strip including a line target having a plurality of lines of known spacing;

obtaining a series of linear array sensor profiles for each strip at different relative positions of the linear array sensor to the strips in a direction perpendicular to a direction of the plurality of lines;

extracting line centers from the linear array sensor profile; and determining a displacement associated with each pixel of the linear array sensor based on the known spacing and the extracted line centers.

14. The machine-readable medium according to claim 13, determining the displacement including:

obtaining a measured spacing of the plurality of lines based on the extracted line centers; and determining the displacement associated with each pixel of the linear array sensor based on the known spacing and the obtained line spacing.

15. The machine-readable medium according to claim 13, the target pattern including first and second strips, the first strip including a first line target having a first plurality of lines of a first known spacing, the second strip including a second line target having a second plurality of lines of a second known spacing, and the first known spacing being different from the second known spacing.

16. The machine-readable medium according to claim 13, obtaining the series of linear array sensor profiles including obtaining the series of linear array sensor profiles when the linear array sensor is in a fixed position.

17. The machine-readable medium according to claim 13, obtaining the series of linear array sensor profiles including obtaining a plurality of measurements with the linear array sensor moved in the direction perpendicular to a direction of the plurality of lines.

18. The machine-readable medium according to claim 13, a first pair of neighboring lines in the plurality of lines having a first distance between the first pair of neighboring lines, a second pair of neighboring lines in the plurality of lines having a second distance between the second pair of neighboring lines, and the first distance being different from the second distance.

19. The machine-readable medium according to claim 13, a first pair of neighboring lines in the plurality of lines having a first distance between the first pair of neighboring lines, a second pair of neighboring lines in the plurality of lines having a second distance between the second pair of neighboring lines, and the first distance being equal to the second distance.

20. A system for spatial calibration of a linear array sensor, the linear array sensor having a plurality of pixels, the system comprising:

a receiving member that forms a target pattern having one or more strips, each strip including a line target having a plurality of lines of known spacing;

a sensor response obtaining circuit, routine or application that obtains a series of linear array sensor profiles for each strip at different relative positions of the linear array sensor to the strips in a direction perpendicular to a direction of the plurality of lines;

a line center extracting circuit, routine or application that extracts line centers from the linear array sensor profile; and a displacement determining circuit, routine or application that determines a displacement associated with each pixel of the linear array sensor based on the known spacing and the extracted line centers.

21. The system of claim 20, wherein the displacement determining circuit, routine or application obtains a measured spacing of the plurality of lines based on the extracted line centers and determines the displacement associated with each pixel of the linear array sensor based on the known spacing and the obtained line spacing.

22. The system of claim 20, the receiving member being a drum of a printer.

23. The system of claim 20, the receiving member being a belt of a printer.

24. The system of claim 20, the receiving member being a piece of paper.

25. The system of claim 20, the target pattern including first and second strips, the first strip including a first line target having a first plurality of lines of a first known spacing, the second strip including a second line target having a second plurality of lines of a second known spacing, and the first known spacing being different from the second known spacing.

26. The system of claim 20, wherein the sensor response obtaining circuit, routine or application obtains the series of linear array sensor profiles when the linear array sensor is in a fixed position.

27. The system of claim 20, wherein the sensor response obtaining circuit, routine or application obtains a plurality of measurements with the linear array sensor moved in the direction perpendicular to a direction of the plurality of lines.

28. The system of claim 20, a first pair of neighboring lines in the plurality of lines having a first distance between the first pair of neighboring lines, a second pair of neighboring lines in the plurality of lines having a second distance between the second pair of neighboring lines, and the first distance being different from the second distance.

29. The system of claim 20, a first pair of neighboring lines in the plurality of lines having a first distance between the first pair of neighboring lines, a second pair of neighboring lines in the plurality of lines having a second distance between the second pair of neighboring lines, and the first distance being equal to the second distance.

* * * * *